United States Patent [19]
Anderson

[11] 4,107,593
[45] Aug. 15, 1978

[54] CURRENT CONTROL CIRCUIT

[75] Inventor: Eric G. Anderson, Rochester, Mich.

[73] Assignee: Burroughs Corporation, Detroit, Mich.

[21] Appl. No.: 785,661

[22] Filed: Apr. 7, 1977

[51] Int. Cl.$^2$ ............................................. H02K 37/00
[52] U.S. Cl. ................................... 318/685; 318/138
[58] Field of Search ................. 318/685, 696, 254, 138

[56] References Cited
U.S. PATENT DOCUMENTS 3,885,210  5/1975  Burnett ............................... 318/696

*Primary Examiner*—Herman J. Hohauser
*Attorney, Agent, or Firm*—David R. Syrowik; Carl Fissell, Jr.; Kevin R. Peterson

[57] ABSTRACT

An electronic circuit is provided for controlling the energization of the windings of a stepper motor. The electronic circuit is responsive to a sequencing circuit which selects which one of the stepper windings is to be energized. The electronic circuit includes switching transistors which are electrically connected to the stepper windings. The switching transistors are responsive to a control circuit to allow a selected one of the stepper windings to be energized by a voltage source. The switching transistors interrupt the energization of the selected stepper winding when the control circuit senses a predetermined amount of current flowing through the selected stepper winding. The control circuit causes the switching transistors to maintain this interruption for a predetermined time period after which the control circuit allows the energization to continue. The control circuit includes a resettable delay monostable multivibrator which is reset upon receiving a sequencing signal from the sequencing circuit. After being reset, the multivibrator provides a signal which immediately allows a second stepper winding to be energized.

10 Claims, 3 Drawing Figures

WINDING VOLTAGE

I RATED

WINDING CURRENT

CURRENT CONTROL CIRCUIT

BACKGROUND OF THE INVENTION

This invention relates in general to current control circuits and in particular to current control circuits for controlling the sequential energization of an external load having at least two conductors.

A number of prior art methods and apparatus exist for driving stepping motors. One common problem associated with the driving of stepping motors is the problem of creating a constant current operation when the windings of the stepping motor are energized. One prior method used to obtain constant current operation through a selected energized winding is the use of a current sensing network in each winding set to turn off a high voltage switching transistor in each winding when the current reaches its desired value. The switching transistor turns on again to allow the current to flow through the selected stepper windings when the current decreases below the threshold. This method is undesirable because of the high cost of high-speed, high-current transistors.

The U.S. Patent to Kogler et al., U.S. Pat. No. 3,967,174 issued June 29, 1976, discloses a method and apparatus for controlling the current to a Y-connected stator winding. The Kogler patent, however, does not teach the use of a resettable timing circuit as part of its control circuit and therefore does not provide efficient cyclic control of the current to lower power losses and raise efficiency.

The subject invention seeks to hold the motor current at a predetermined level at each successive coil or winding in a stepper motor. Multiple power transistors and control circuits are avoided by the use of a control circuit based at a ground reference level. The control circuit also provides current control without the attendant cost or complexity of other current control circuits such as well known chopping circuits which use two power transistors per winding.

An electronic circuit is provided for controlling the energization of an external load having at least two conductors, a sequencing circuit selecting which one of the conductors is to be energized. An electronic circuit constructed in accordance with the instant invention includes a switching means for sequentially allowing the conductors to be energized whereby an electric current flows therethrough a selected one of the conductors. The electronic circuit also includes a control means responsive to a predetermined amount of current flowing through the selected conductor for interrupting the energization for a predetermined time period. The switching means is responsive to the control means to allow the energization to continue after the predetermined time period.

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
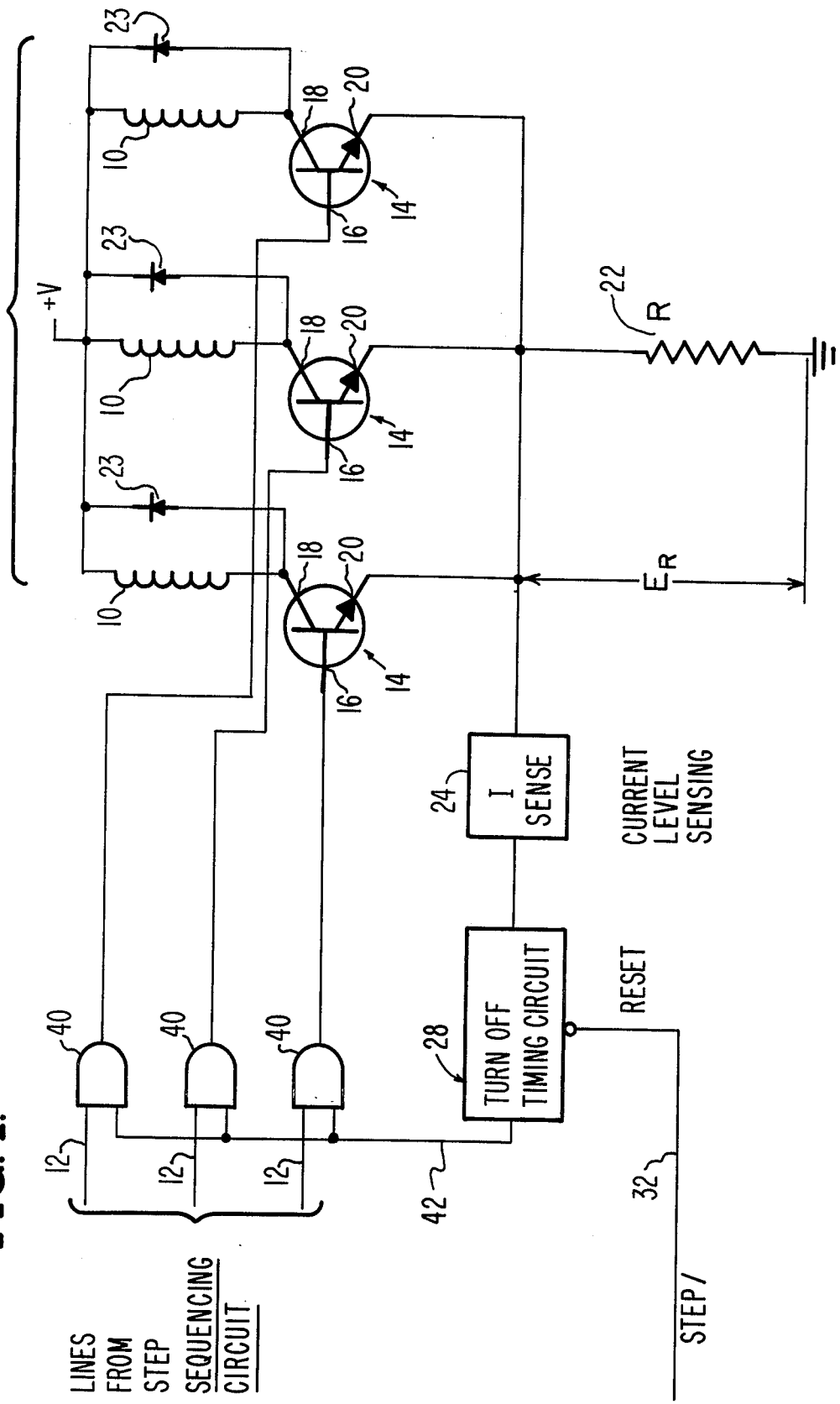
FIG. 1 is a circuit diagram of the subject invention partially in block diagram form.

An electronic circuit for controlling the energization of an external load such as a stepping motor is generally shown in FIG. 1. A sequencing circuit, not shown, selects which one of the stepper windings 10 of the stepper motor is to be energized by means of a voltage source, V. The sequencing circuit provides a high or logical "1" signal at one of the three input lines 12 to signal or indicate which one of the stepper windings 10 is to be energized.

Switching means or switching transistors 14 sequentially allow the windings 10 to be energized whereby an electric current flows through a selected one of the windings 10. A particular switching transistor 14 is turned on when a logical "1" or high voltage signal occurs at the base 16 of the particular switching transistor 14. When a particular switching transistor 14 is turned on, the supply voltage causes the particular stepper winding 10 to be energized whereby an electric current flows therethrough the selected stepper winding 10. The current flowing through the stepper winding 10 flows through the switching transistor 14 between the collector 18 and the emitter 20 of the switching transistor 14. The current thereafter flows across a reference conductor or resistor R, 22. As can be seen in FIG. 1, any current which flows through any of the switching transistors 16 also flows across the reference resistor 22 which is a one-half ohm resistor rated at 5 watts.

By-pass diodes 23 are provided in parallel across each of the stepper windings 10 to store the current flowing through the stepper windings 10 during the timed-off cycle.

A comparison means denoted I, sense in the block in FIG. 1, comprises, in the preferred embodiment of the invention, a differential comparator 24. The differential comparator 24 compares the current appearing across the reference resistor 22 in the form of a voltage $E_R$ with a reference signal corresponding to the predetermined amount of current shown as I rated current 26 in FIG. 2. The differential comparator 24 provides an overflow signal in the form of a logical "0" or low signal when the current appearing across the resistor 22 exceeds the rated current 26.

Figure 2:
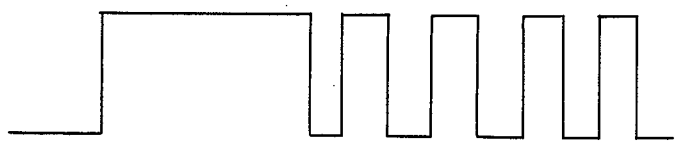
FIG. 2 is a graph illustrating how the winding voltage and the winding current vary in time in response to the subject current control circuit after the initial excitation of the windings.
Figure 2:
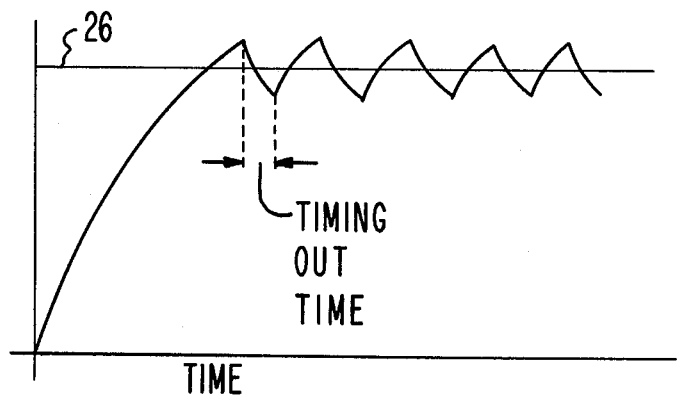
Figure 3:
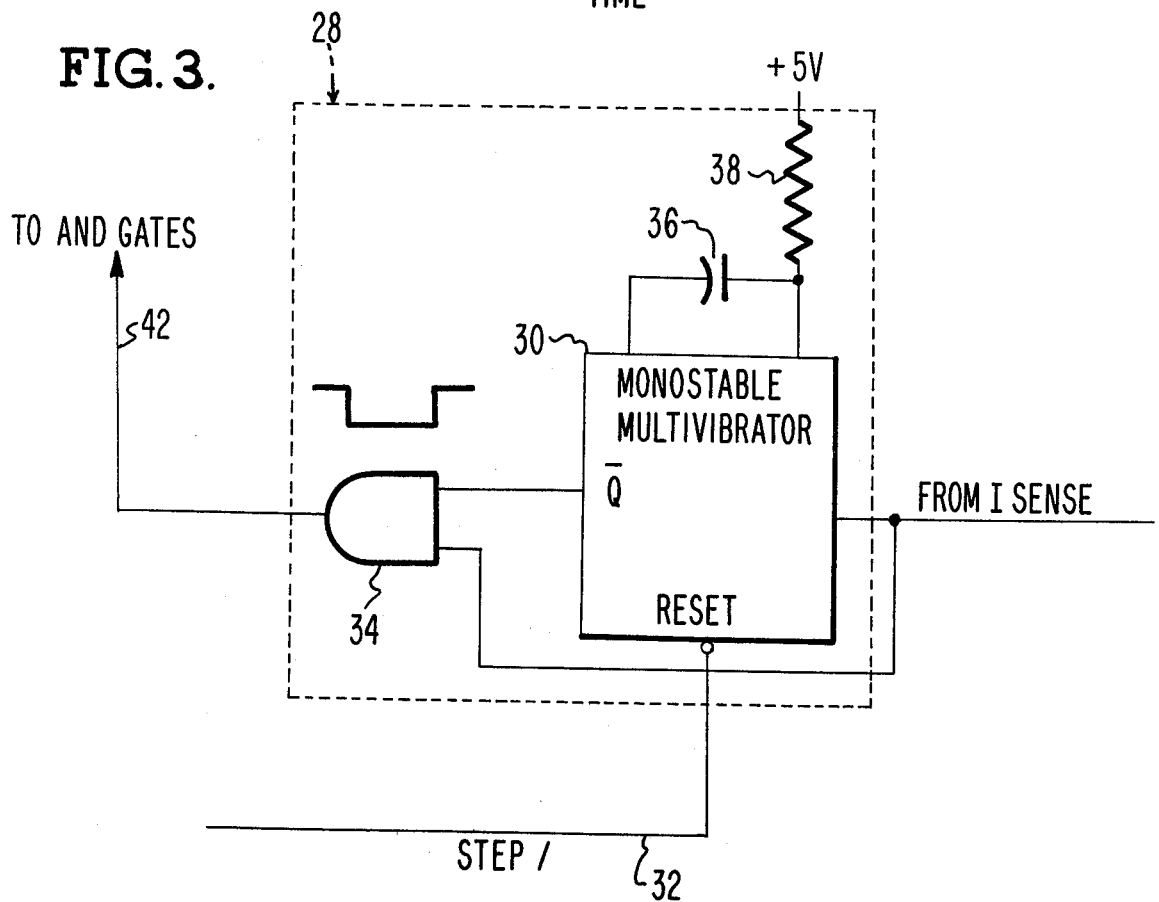
FIG. 3 is a circuit representation showing the components of the turn-off timing current block of FIG. 1.

A fixing means or a turn-off timing circuit generally indicated at 28 in FIG. 1 and in FIG. 3 is provided for fixing the predetermined time period or timing-out time shown in FIG. 2. The turn-off timing circuit 28 includes a resettable delay monostable multivibrator 30 which, in the preferred embodiment, is a TTul 9601 Fairchild semiconductor. At its reset terminal, the multivibrator or one-shot 30 is responsive to a sequencing signal from the sequencing circuit in the form of the signal, step/, along a line 32 to immediately allow a second winding to be energized upon the occurrence of the sequencing signal from the sequencing circuit.

The turn-off timing circuit 28 also includes logic means or AND gate 34 which is electrically connected to the Q output of the multivibrator 30 and is also connected to the output of the differential comparator 24 to provide an interruption signal upon the concurrent reception of the overflow signal from the differential comparator 24 and upon receiving a delay signal from the multivibrator 30, which delay signal is a logical "0" or low signal delayed a predetermined time and which is generated in response to receiving the overflow signal from the differential comparator 24. The delay signal from the multivibrator 30 is delayed for a time period determined by a capacitor 36 and a resistor 38 which comprise an RC circuit having a predetermined time period. In the present embodiment the capacitor 36 has a value of 0.15 microferrads and resistor has a value of 5.6 kilohms.

The control circuit further includes gating means or logical AND gates 40 which are responsive to the interruption signal emitted by the turn-off timing circuit 28 to interrupt the energization of a selected conductor 10. Conversely, in the absence of an interruption signal from the AND gate 34, a logical 37 1" or high signal appears on line 42 thereby enabling that particular AND gate 40 which is selected by the sequencing circuit along the selected line 12. The interruption signal is provided by the AND gate 34 from the time that a differential comparator 24 outputs its overflow signal and until the multivibrator 30 has timed-out. The multivibrator 30 as previously indicated may have an abreviated timing-out period if it is reset during its timing-out period by the sequencing circuit by the signal step 0, or a sequencing signal along the line 32. In this way the conductor 10 selected by the sequencing circuit is immediately energized upon selection by the sequencing circuit.

Another important feature of the control circuitry is that it is common to each stepper winding and its gating. In other words, one control circuit is used for any number of stepper windings. As a result, each transistor 14 creates a constant current sink with low dissipation because it switches completely off and then completely on. Many other current control circuits use a control circuit per winding and two power transistors — one a $V_{cc}$ or V, and the other at ground.

The invention has been described in an illustrative manner and it is to be understood that the terminology which has been used is intended to be in the nature of words of description rather than of limitation.

Obviously, many modifications and variations of the present invention are possible in light of the above teachings. It is therefore to be understood that within the scope of the appended claims the invention may be practiced otherwise than as specifically described.

I claim:

1. An electronic circuit for controlling the energization of an external load having at least two conductors, a sequencing circuit selecting which one of the conductors to be energized, said circuit comprising:
   switching means for sequentially allowing the conductors to be energized whereby an electric current flows therethrough a selected one of the conductors; and
   control means responsive to a predetermined amount of current flowing through the selected conductor for interrupting said energization for a predetermined time period, said switching means being responsive to said control means to allow said energization to continue after said predetermined time period until said predetermined amount of current again flows through the selected conductor wherein said control means interrupts said energization again for said predetermined time period.

2. The circuit as defined in claim 1 wherein said control means includes fixing means for fixing said predetermined time period.

3. The circuit as defined in claim 1 wherein the sequencing circuit provides a sequencing signal to signal the selection of a second conductor to be energized and wherein said control means includes fixing means for fixing said predetermined time period and wherein a portion of said fixing means is responsive to said sequencing signal to allow the second conductor to be energized upon the occurrence of the sequencing signal.

4. The circuit as defined in claim 3 wherein said control means includes a common comparison means for comparing said current with a reference signal corresponding to said predetermined amount of current, said comparison means providing an overflow signal when said current exceeds said predetermined amount.

5. The circuit as defined in claim 4 wherein said fixing means provides a delay signal in response to said overflow signal and wherein said fixing means includes logic means responsive to said overflow signal and said delay signal to provide an interruption signal.

6. The circuit as defined in claim 5 wherein said control means includes gating means responsive to said interruption signal and said sequencing circuit for controlling the energization of the conductors.

7. The circuit as defined in claim 6 wherein said fixing means includes a resettable monostable multivibrator.

8. The circuit as defined in claim 7 wherein said comparison means includes a differential amplifier.

9. The circuit as defined in claim 8 wherein said comparison means includes a common reference conductor through which said electric current flows to develop corresponding voltage, said differential comparator being responsive to the voltage developed when said predetermined amount of current flows through said conductor to provide said overflow signal.

10. The circuit as defined in claim 9 wherein the external load comprises a plurality of stepper windings and wherein the gating means comprises a corresponding number of logical AND gates.

* * * * *